US005916245A

United States Patent [19]

Tom

[11] Patent Number: 5,916,245

[45] Date of Patent: Jun. 29, 1999

[54] HIGH CAPACITY GAS STORAGE AND DISPENSING SYSTEM

[75] Inventor: Glenn M. Tom, New Milford, Conn.

[73] Assignee: Advanced Technology Materials, Inc., Danbury, Conn.

[21] Appl. No.: 09/056,369

[22] Filed: Apr. 7, 1998

Related U.S. Application Data

[63] Continuation-in-part of application No. 08/859,172, May 20, 1997, Pat. No. 5,761,910

[60] Provisional application No. 60/019,043, May 20, 1996.

[51] Int. Cl.[6] .................................... F17C 11/00

[52] U.S. Cl. .................................... 62/46.1; 95/95; 96/108; 206/0.7

[58] Field of Search .................................... 62/46.1; 95/95; 96/108; 206/0.7

[56] References Cited

U.S. PATENT DOCUMENTS

| | | | |
|---|---|---|---|
| 240,423 | 4/1881 | James . | |
| 1,608,155 | 11/1926 | Barnebey . | |
| 1,714,245 | 5/1929 | Schaefer | 96/146 X |
| 2,356,334 | 8/1944 | Maude et al. . | |
| 2,450,289 | 9/1948 | Marek | 96/146 X |
| 2,663,626 | 12/1953 | Spangler . | |
| 2,987,139 | 6/1961 | Bush . | |
| 2,997,371 | 8/1961 | Wadsworth et al. . | |
| 3,006,153 | 10/1961 | Cook . | |
| 3,080,307 | 3/1963 | Rinald | 96/127 X |
| 3,093,564 | 6/1963 | Weisman et al. | 96/127 X |
| 3,116,132 | 12/1963 | Haller et al. . | |
| 3,144,200 | 8/1964 | Taylor et al. . | |
| 3,176,444 | 4/1965 | Kiyonaga | 95/97 X |
| 3,264,803 | 8/1966 | Read | 96/146 X |
| 3,287,432 | 11/1966 | Sensel . | |
| 3,415,069 | 12/1968 | Hauser | 96/126 X |
| 3,469,375 | 9/1969 | Barrington et al. | 96/146 X |
| 3,675,392 | 7/1972 | Reighter . | |
| 3,713,273 | 1/1973 | Coffee . | |

(List continued on next page.)

FOREIGN PATENT DOCUMENTS

| | | | |
|---|---|---|---|
| 2264512 | 3/1971 | Germany . | |
| 3139-781 | 10/1981 | Germany . | |
| 1095796 | 12/1960 | Japan . | |
| 52-72373 | 12/1975 | Japan . | |
| 61-133116 | 6/1986 | Japan | 96/126 |
| 63-88017 | 10/1986 | Japan . | |
| 3-127606 | 10/1989 | Japan . | |
| 1181692 | 11/1983 | U.S.S.R. . | |
| 1544475A1 | 12/1987 | U.S.S.R. . | |
| 1583151A1 | 5/1988 | U.S.S.R. . | |

OTHER PUBLICATIONS

"Beaded Carbon UPS Solvent Recovery," Chemical Engineering, vol. 84, No. 18 pp. 39–40, Aug. 29, 1977 (copy in 96/126).

*Primary Examiner*—Ronald Capossela
*Attorney, Agent, or Firm*—Steven J. Hultquist; Oliver A.M. Zitzmann

[57] ABSTRACT

A system for the storage and on-demand dispensing of a fluid that is sorbable on a physical sorbent and that subsequent to sorption is desorbable from the sorbent by pressure-mediated desorption and/or thermally-mediated desorption. The system includes a storage and dispensing vessel containing the physical sorbent, and a desorbed gas retention structure, e.g., a storage vessel, or an extended length of gas flow conduit, for holding fluid that is desorbed from the physical sorbent and flowed to the retention structure for subsequent discharge. A pump is operatively coupled in gas flow communication with the storage and dispensing vessel, and selectively operable to effect desorption of fluid in the storage and dispensing vessel, and transfer of desorbed fluid to the retention structure for holding therein. An actuating assembly monitors the pressure of fluid held in the retention structure and responsively thereto controls the pump, to maintain a predetermined pressure range and amount of fluid in the retention structure for subsequent discharge therefrom.

39 Claims, 4 Drawing Sheets

116 124 108 110 118 105 122 104 114 A 106 113 120 102 112 101

U.S. PATENT DOCUMENTS 3,719,026 3/1973 Sand .
3,732,690 5/1973 Meijer .................................... 60/39.46
3,788,036 1/1974 Lee et al. .
3,972,201 8/1976 Datis ........................................ 62/46.1
4,023,701 5/1977 Dockery .
4,168,149 9/1979 Armond et al. ........................ 95/96 X
4,263,018 4/1981 McCombs et al. .
4,343,770 8/1982 Simons .
4,414,005 11/1983 DeBiévre et al. .
4,477,265 10/1984 Kumar et al. ........................... 95/96 X
4,552,571 11/1985 Dechene .................................. 95/96 X
4,578,256 3/1986 Nishino et al. .
4,673,415 6/1987 Stanford .................................. 95/96 X
4,723,967 2/1988 Tom ...................................... 96/108 X
4,738,693 4/1988 Tom ...................................... 96/108 X
4,738,694 4/1988 Godino et al. ........................ 96/126 X
4,744,221 5/1988 Knollmueller .............................. 62/48
4,749,384 6/1988 Nowobilski et al. .
4,756,163 7/1988 Garg ......................................... 62/46.1
4,761,395 8/1988 Tom et al. .............................. 502/401
4,869,733 9/1989 Stanford .................................. 95/96 X
4,881,958 11/1989 Eckardt et al. ........................... 96/127
4,930,319 6/1990 Bee et al. ................................. 62/46.1
5,051,117 9/1991 Prigge et al. ............................... 95/95
5,089,244 2/1992 Parent et al. .
5,114,440 5/1992 Reiss ........................................... 95/96
5,133,787 7/1992 Diot et al. .
5,151,395 9/1992 Tom .
5,202,096 4/1993 Jain ....................................... 96/126 X
5,224,350 7/1993 Mehra ..................................... 95/96 X
5,238,469 8/1993 Briesacher et al. ................... 96/126 X
5,385,689 1/1995 Tom et al. .............................. 252/194
5,409,526 4/1995 Zheng et al. .
5,417,742 5/1995 Tamhankar et al. .
5,518,528 5/1996 Tom et al. .

HIGH CAPACITY GAS STORAGE AND DISPENSING SYSTEM

CROSS REFERENCE TO RELATED APPLICATIONS

This is a continuation-in-part of U.S. patent application Ser. No. 08/859,172 filed May 20, 1997, now U.S. Pat. No. 5,761,910, in the name of Glenn M. Tom, which in turn is based on and claims the priority of U.S. Provisional patent application Ser. No. 60/019,043 filed May 20, 1996 in the name of Glenn M. Tom.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More specifically, the invention relates to a storage and dispensing system of such type which is able to supply desorbed fluid at constant high rate during sustained operation.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorptiondesorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

It is an object of the present invention to provide an improved fluid storage and dispensing system of the above-described type, which is capable of supplying fluid at sustained high flow rates.

Other objects and advantages of the invention will be more fully apparent from the ensuing disclosure.

SUMMARY OF THE INVENTION

The present invention relates to a system for storage and dispensing of a sorbable fluid, comprising a storage and dispensing vessel holding a solid-phase physical sorbent medium having a sorptive affinity for the sorbable fluid. The sorbable fluid is physically adsorbed on the sorbent medium. A dispensing assembly is coupled in gas flow communication with the storage and dispensing vessel, and constructed and arranged for selective on-demand dispensing of desorbed fluid, after thermal and/or pressure differential-mediated desorption of the fluid from the sorbent material.

The dispensing assembly may for example be constructed and arranged:

(I) to provide, exteriorly of said storage and dispensing vessel, a pressure below the interior pressure, to effect desorption of fluid from the sorbent material, and flow of desorbed fluid from the vessel through the dispensing assembly; and/or (II) to flow thermally desorbed fluid therethrough, and comprising means for heating the sorbent material to effect desorption of the fluid therefrom, so that the desorbed fluid flows from the vessel into the dispensing assembly.

The dispensing assembly may be arranged to include a pump to exert pumping action or suction on the interior volume of the storage and dispensing vessel, to extract fluid desorbed from the sorbent material therein.

The present invention more particularly contemplates the provision of a storage and dispensing system of the general type more fully described in U.S. Pat. No. 5,518,528, in combination with a desorbed fluid retention (holding) structure, a pump operatively coupled in gas flow communication with the storage and dispensing vessel, and flow control means operatively coupled with the pump, to provide a sustained high flow rate dispensing of fluid from the desorbed fluid retention structure in the operation of the system.

The desorbed fluid retention structure utilized in the broad practice of the present invention may be widely varied. Such retention structure may for example comprise a surge tank or hold-up vessel or other container serving as a hold-up volume for the desorbed fluid.

Alternatively, the retention structure may constitute the interior volume of piping, conduits, flow passages or other fluid transport structure, having sufficient interior volume to function effectively as a fluid flow ballast structure, so that the retained fluid is provided in the retention structure in sufficient amount for high rate sustained discharge from the system during its operation.

In one preferred aspect of the invention, the pressure of the fluid in the desorbed fluid retention structure is monitored and the pressure level is employed to correspondingly control the pumping action of the pump, to achieve the desired high flow rate dispensing of gas.

For example, the pressure sensing of the hold-up fluid in the retention structure may be employed for controlling the speed of a mechanical pump, e.g., a rotary mechanical pump, to achieve the desired flow rate of dispensed fluid. Alternatively, the monitored pressure may be utilized for controlling a throttling valve upstream of the pump, whereby the pumping action is selectively adjusted (increased or decreased) as appropriate to achieve the desired fluid flow rate for dispensing. As yet another alternative, the pressure monitoring may be conducted to actuate a back pressure regulator which serves to correspondingly modulate flow to the pump, to achieve the desired flow rate of discharged fluid from the storage and dispensing system.

Other aspects and features of the invention will be more fully apparent from the ensuing disclosure.

DETAILED DESCRIPTION OF THE INVENTION, AND PREFERRED EMBODIMENTS THEREOF

The disclosures of the following U.S. patents and patent application are hereby incorporated herein by reference in their entirety:

U.S. patent application Ser. No. 08/809,019 filed Apr. 11, 1997;

U.S. Pat. No. 5,518,528 issued May 21, 1996;

U.S. Pat. No. 5,704,965 issued Jan. 6, 1998;

U.S. Pat. No. 5,704,967 issued Jan. 6, 1998;

U.S. Pat. No. 5,707,424 issued Jan. 13, 1998;

U.S. patent application Ser. No. 08/859,172 filed May 20, 1997; and

U.S. patent application Ser. No. 09/002,278 filed Dec. 31, 1997.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
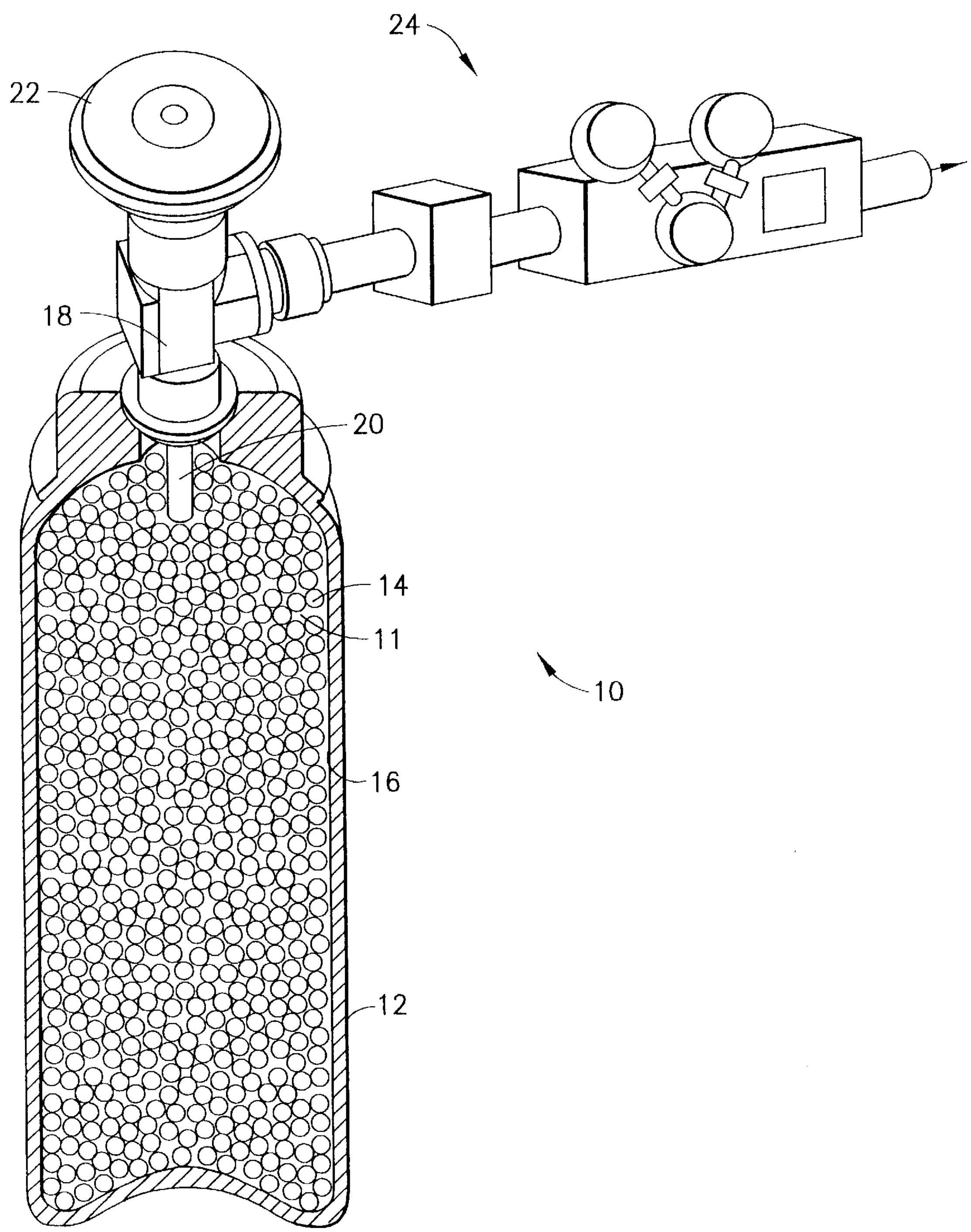
FIG. 1 is a schematic representation of a storage and dispensing vessel and associated flow circuitry according to one embodiment of the invention.

Referring now to the drawings, FIG. 1 is a schematic representation of a storage and dispensing system 10 comprising storage and dispensing vessel 12. The storage and dispensing vessel may for example comprise a conventional gas cylinder container of elongate character bounded by wall 16, having an aspect ratio of height to diameter which may for example be in the range of from about 3 to about 10. The storage and dispensing vessel may have an interior volume in the range of from about 0.25 liter to about 40 liters, such that the storage and dispensing vessel is manually transportable in character.

In the interior volume 11 of such vessel is disposed a bed of a suitable sorbent medium 14.

The vessel 12 is provided at its upper end with a valve head 18 communicating with the interior volume 11 of the vessel through inlet tube 20. The inlet tube 20 may have a frit or other filter element therein, to prevent entrainment of particulate solids in the fluid being dispensed from the vessel.

The valve head 18 may be provided with a hand wheel 22 or other valve adjustment means (such as an automatic valve actuator operatively joined to the valve element in the valve head and coupled with suitable controllers and monitoring elements), for selectively opening the valve of the valve head for fluid dispensing from the vessel and for selectively closing the valve of the valve head to terminate the flow of such fluid. The valve head 18 is coupled as shown to a fluid dispensing assembly 24.

The sorbent medium 14 may comprise any suitable sorptively effective material, having sorptive affinity for the fluid to be stored in and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon I sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

Figure 2:
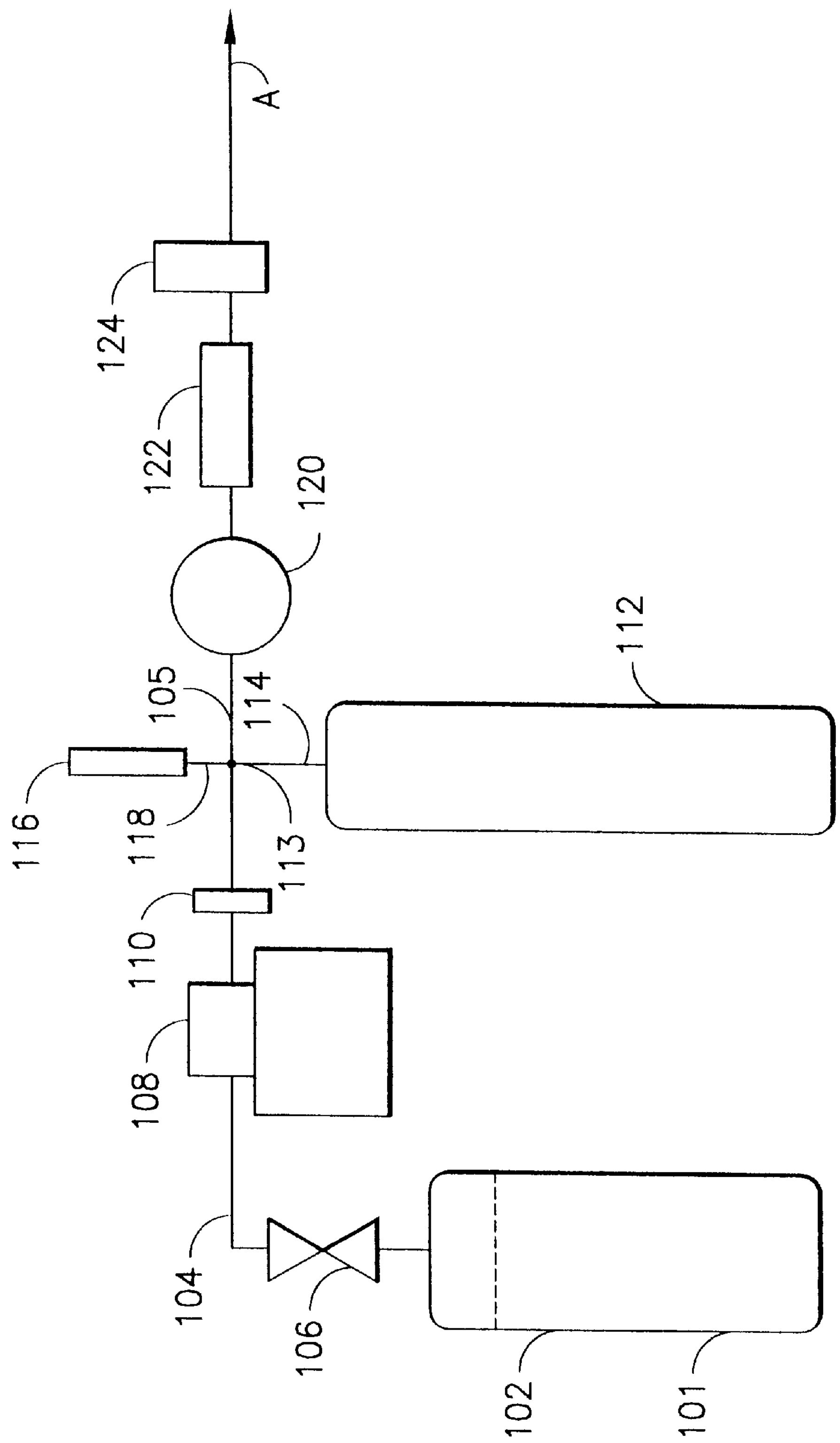
FIG. 2 is a schematic flowsheet of a high rate delivery storage and dispensing system according to one aspect of the present invention.

FIG. 2 is a schematic flowsheet of a high rate delivery storage and dispensing system 100 according to one aspect of the present invention. The system illustrated can be utilized to deliver large amounts of the sorbate fluid from the storage and dispensing system at high flow rates.

The system 100 comprises a storage and dispensing vessel 101 containing a bed 102 of sorbent material having sorptive affinity for the fluid to be stored in and subsequently dispensed from the vessel. The vessel as schematically illustrated in FIG. 2 is joined to a discharge line 104, which may comprise a conduit, tubing, piping, flow channel, or other flow passage means for dispensing fluid from the storage and dispensing vessel.

A flow control valve 106 is provided in line 104, with a pump 108 downstream therefrom and a filter 110 for attenuating particulates which otherwise may be present in the fluid flowed in line 104 from the storage and dispensing vessel, or which are otherwise generated in the pump.

The pump may be of any suitable type, but preferably is a double-stage, all-metal sealed diaphragm pump. Such pumps are preferred in the practice of the invention for safety and purity reasons, and are characterized by low leak rates and capacity of high pumping speeds.

Line 104 is joined to a 4-way connector 113. The 4-way connector is joined by means of line 114 to surge tank 112, thereby establishing flow communication of the surge tank 112 with the storage and dispensing vessel 102 and pump 108.

A pressure transducer 116 is joined to the 4-way connector via line 118. The 4-way connector 113 additionally is connected to the fluid dispensing discharge line 105, having disposed therein an absolute pressure regulator 120, a purifier 122, and a mass flow controller 124. Fluid exiting the fluid dispensing discharge line 105 is passed by suitable flow passage means (not shown), in the direction indicated by arrow A, to the downstream process system or locus of use of the dispensed fluid.

In operation, the storage and dispensing vessel, containing the sorbent material which sorptively holds the fluid to be dispensed, is subjected to pumping by the pump 108, with the filtered (by filter 110) fluid at the high pressure side of the pump being fed to the surge tank 112. The system can be set for turn-down or turn-off of the pump, or isolation of the inlet of the pump, by a suitable valve means (not shown), when the pressure monitored by the pressure transducer 116 rises to a high predetermined limit, e.g., 700 Torr. Correspondingly, the system can be selectively arranged, by means of suitable controller and actuator means of a type well known in the art, for turn-on of the pump, or opening of an isolation valve at the inlet to the pump (not shown), when the pressure monitored by the pressure transducer declines to a predetermined lower limit, e.g., 300 Torr.

The fluid pressure downstream from the surge tank is monitored by the absolute pressure regulator 120. The purifier 122 downstream from the absolute pressure regulator serves to purify the fluid being dispensed, to chemisorptively remove any deleterious or unwanted components from the fluid stream, e.g., water and oxidants. The purifier also serves to provide filtration of the dispensed fluid stream. The purifier may be of any suitable type, including purifiers commercially available from Millipore Corporation (Bedford, MA) under the trademark "Waferpure."

The mass flow controller 124 serves to maintain a selected fluid flow rate, appropriate to the end use of the storage and dispensing system.

By the provision of the storage and dispensing system of the character illustratively shown in FIG. 2, it is possible to utilize a storage and dispensing system holding sorbable fluid in the vessel at a low pressure, e.g., in the range of for example 50 to 700 Torr, as desirable from a safety and handling standpoint, but at the same time provide on demand a high flow rate stream of the sorbate fluid from the vessel via the surge tank.

In the system illustratively shown in FIG. 2, the pressure transducer 116 may be operatively linked in controlling relationship to the pump 108 or to the flow control valve 106 to modulate the pumping action of pump 108 in response to the fluid pressure of the fluid contained in surge tank 112, as hereafter more fully described.

Additionally, the line 104 may itself constitute a fluid retention volume, if the length of line 104 is sufficiently long. For example, the line 104 may be constituted by an extended run of piping having an appropriate length to provide the desired fluid hold-up volume therein, and thereby provide sufficient inventory of fluid in the line to dispense fluid at a desired high rate.

Figure 3:
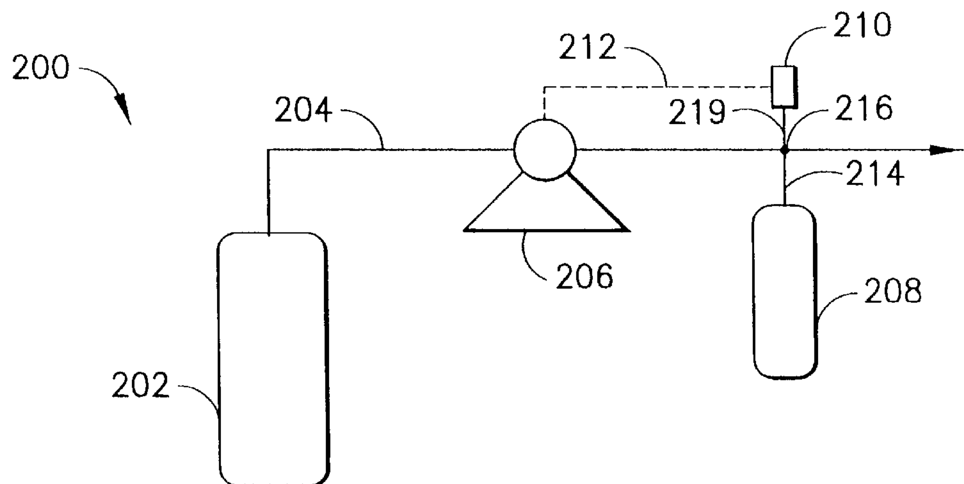
FIG. 3 is a schematic flowsheet of a high rate delivery storage and dispensing system according to another aspect of the present invention, utilizing pressure monitoring to directly control a pump in the desorbed fluid discharge line.

FIG. 3 is a schematic representation of a fluid storage and dispensing system according to another embodiment of the invention, including a storage and dispensing vessel 202 containing sorbent having a sorbate fluid thereon. The vessel 202 is connected to line 204 having pump 206 therein.

The four-way connector 216 in line 204 joins such line in fluid flow communication with holdup vessel 208 (by means of connecting line 214). Pressure transducer 210 is joined to the fourway connector 216 by pressure tap line 219.

In the FIG. 3 system, the pressure transducer is controllably linked by signal transmission line 212 with the pump 206. Such schematic depiction represents the pump as being selectively adjustable to vary its pumping action, by means of a signal transmitted in signal line 212. The signal transmitted in such line is correlative to the pressure of the desorbed fluid in the hold-up vessel 208.

In such manner, the pump is selectively adjusted to maintain a desired pressure level in the hold-up vessel 208, thereby furnishing an inventory of desorbed gas at appropriate pressure for discharge in line 204, downstream of four-way connector 216.

Figure 4:
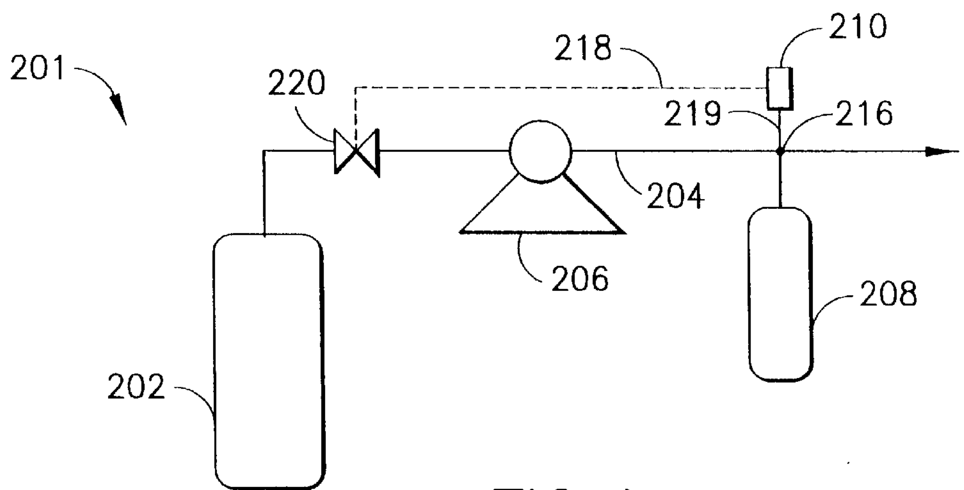
FIG. 4 is a schematic flowsheet of a high rate delivery storage and dispensing system according to yet another embodiment of the invention, wherein pressure of fluid in the discharge line is employed to adjust a throttle valve to modulate the flow of fluid to the pump in the discharge line.

FIG. 4 is a schematic representation of another fluid storage and dispensing system 201, wherein the same apparatus elements are correspondingly numbered with respect to the corresponding features in FIG. 3.

In the FIG. 4 embodiment, the pressure transducer 210 is linked by signal transmission line 218 to a throttle valve 220 which is selectively adjusted in response to the pressure sensed by transducer 210, to correspondingly vary the throttle valve setting and modulate the pumping action of pump 206, to maintain a desired pressure and inventory of desorbed fluid in hold-up vessel 208.

In contrast to the FIG. 3 system, wherein the pump 206 may be turned on or shut off during the operation of the system, the pump in the FIG. 4 embodiment is continuously on and is throttled by adjustment of the valve 220, to maintain an appropriate inventory of desorbed gas in the holdup vessel 208 for dispensing.

Figure 5:
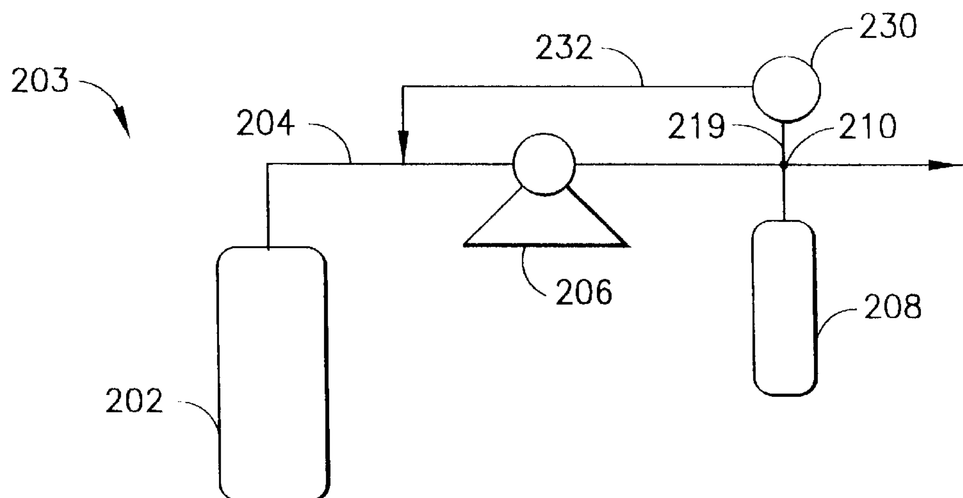
FIG. 5 is a schematic flowsheet of a high rate delivery storage and dispensing system according to a further embodiment of the invention, wherein a back pressure regulator is employed to modulate the pumping action in the system.

FIG. 5 is a schematic representation of yet another fluid storage and dispensing system 203, wherein the same apparatus elements are numbered correspondingly with respect to the corresponding features in FIGS. 3 and 4.

In the FIG. 5 embodiment, the four-way connector 210 is connected by line 219 to a back pressure regulator 230. The back pressure regulator senses the pressure of fluid in the hold-up vessel 208, and responsively imposes a back pressure, through gas flow line 232, upstream of the pump 206, to maintain the desired inventory of desorbed fluid in the hold-up vessel 208.

The pump 206 in the FIG. 5 embodiment, as in the FIG. 4 embodiment, is continuously on and the pumping action is varied by operation of the back pressure regulator, to correspondingly modulate the pumping activity and maintain the desired inventory of desorbed fluid in the hold-up vessel 208.

In general, the fluid storage and dispensing system in FIG. 3 is preferred over the systems of FIGS. 4 and 5, for the reason that the continuously "on" character of the pump in the latter two systems makes such systems more maintenance-intensive and susceptible to particle generation deriving from the pump component. In the FIG. 3 system, with its "pump on"/"pump off" mode of operation, the on-line operating time of the pump is significantly reduced, with improved maintenance and lower particle generation characteristics.

Figure 6:
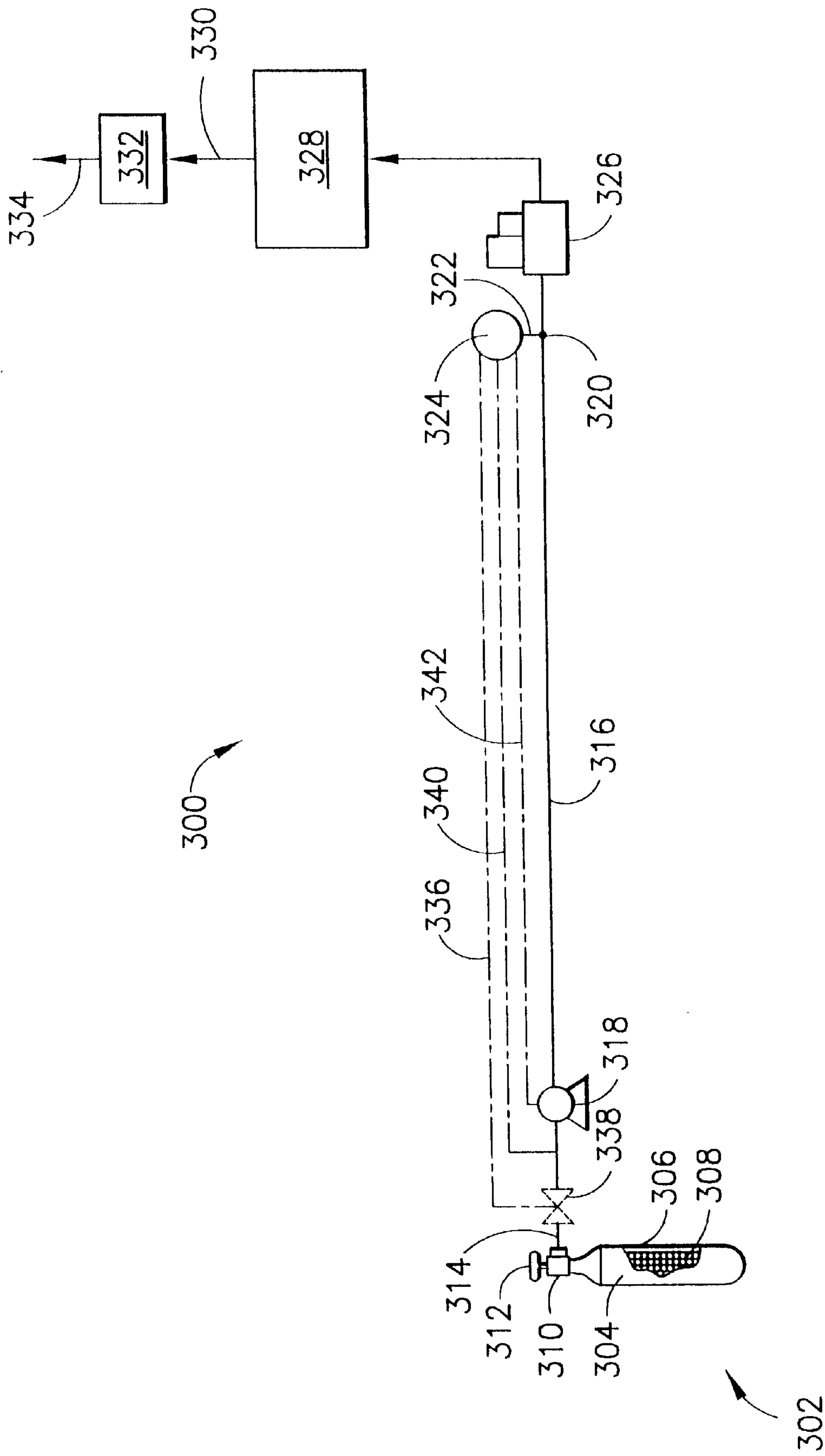
FIG. 6 is a schematic flowsheet of a storage and dispensing system according to yet another embodiment of the invention, wherein an extended run of piping is employed as the desorbed fluid retention structure in the system.

FIG. 6 is a schematic representation of another fluid storage and dispensing system 300 in accordance with the present invention.

The system shown in FIG. 6 comprises a fluid storage and dispensing vessel 302. The vessel 302 has a vessel casing 304 defined by the wall 306 bounding an interior volume of the vessel. The vessel holds the sorbent medium 308 with the fluid to be subsequently dispensed from the vessel sorbed on the sorbent medium.

The vessel 302 features a valve head 310 with a hand wheel 312 for manual opening and closing of the valve in the valve head. The hand wheel 312 may be replaced by or associated with automatic actuation means which function to automatically control the valve in the valve head 310, whereby gas may be discharged from the vessel at a controlled rate.

The valve head 310 features a gas discharge port coupled in flow communication with fluid discharge line 314. The discharge line 314 is connected to pump 318. The pump is operable to provide pumping action in the system and discharges fluid to discharge line 316.

The discharge line 316 is joined to three-way connector 320 which is coupled to pressure monitoring and control unit 324 by pressure tap line 322.

The fluid discharge line 316 downstream of the three-way connector 320 has a mass flow controller 326 disposed therein. The mass flow controller maintains a selected fluid flow rate to the semiconductor manufacturing facility 328. The desorbed fluid is utilized in the semiconductor manufacturing operation to produce a semiconductor product such as a semiconductor material, a semiconductor device, or a semiconductor device precursor structure.

Subsequent to utilization of the desorbed gas, residual effluent gas from the semiconductor manufacturing operation is discharged in line 330 to the effluent treatment complex 332, from which a final purified effluent is discharged in line 334 to the atmosphere or subsequent treatment or end use.

The pressure monitoring and control unit 324 may optionally be coupled in various ways to provide a level of pumping action by pump 318 that ensures the desired inventory of desorbed fluid in line 316 for flow to the semiconductor manufacturing facility 328.

For example, the pressure monitoring and control unit 324 may be linked by signal transmission line 342 directly to pump 318, to selectively actuate or deactuate the pump in response to the pressure monitored by unit 324, and thereby maintain an appropriate inventory of desorbed gas in discharge line 316.

As another approach, the pressure monitoring and control unit 324 may be arranged with a fluid flow line 340 for imposing a selected back pressure on the fluid in line 314 upstream of pump 318, to maintain the desired inventory of desorbed fluid in discharge line 316.

As yet another approach, the pressure monitoring and control unit 324 may be linked by signal transmission line 326 to a flow control valve 338 disposed upstream of pump 318. The flow control valve is selectively adjustable to modulate the flow of desorbed fluid to pump 318 and thereby modulate the pumping activity achieved by such pump.

In the FIG. 6 embodiment, the length of fluid discharge line 316 is appropriately selected to be sufficiently long so that the fluid contained in line 316 provides an appropriate inventory for feeding the semiconductor manufacturing facility 328.

It will be appreciated that the system of the invention may be variously configured and constituted to carry out the process of the invention in accordance with the broad disclosure herein. For example, with reference to the FIG. 2 system, the pressure transducer 116, pump 108, pressure regulator 120, mass flow controller 124, and valve 106, as well as any inlet valve associated with the pump, may all be operatively interconnected in a manual or automatic control system circuit, for controllably operating the storage and dispensing system, to provide dispensed fluid at a predetermined rate, or in accordance with a cyclic demand under the control of a suitable cycle timer means. Such cycle timer means may for example comprise a microprocessor or computer control system, suitably programmed to effect the desired cyclic operation.

Thus, while the invention has been shown and described with reference to specific features, aspects and embodiments herein, it will be appreciated that the invention is susceptible of a wide variety of other embodiments, features and implementations consistent with the disclosure herein. The invention is therefore to be broadly construed and interpreted, within the spirit and scope of the foregoing disclosure.

What is claimed is:

1. A system for the storage and on-demand dispensing of a fluid that is sorbable on a selected physical sorbent and that subsequent to sorption is desorbable from the sorbent by pressure-mediated desorption and/or thermally-mediated desorption, said system comprising:

- a storage and dispensing vessel, containing said physical sorbent;
- a retention structure for holding fluid that is desorbed from the physical sorbent, for subsequent discharge of said fluid from the retention structure;

a pump arranged to transfer desorbed fluid from the storage and dispensing vessel to the retention structure for retention therein; and means for monitoring pressure of fluid held in the retention structure and responsively thereto adjusting the pumping action of the pump, to maintain a predetermined amount of fluid in the retention structure for subsequent discharge from the system.

2. A system according to claim 1, wherein said means comprise flow control means positioned upstream of said pump, to selectively control flow of fluid from the storage and dispensing vessel to the pump.

3. A system according to claim 1, wherein said means comprise a pump controller for controlling the speed of the pump.

4. A system according to claim 1, wherein said means comprise a flow passage for selectively flowing fluid to impose a back pressure on the desorbed fluid upstream of the pump, of a sufficient magnitude to maintain said predetermined amount of fluid in the retention structure.

5. A system according to claim 1, wherein the retention structure comprises a surge tank.

6. A system according to claim 1, wherein the retention structure comprises an interior volume of a flow conduit to which said pump is operatively coupled for flow of desorbed fluid from the storage and dispensing vessel thereinto.

7. A system according to claim 1, further comprising means for heating the physical sorbent in the vessel to thermally desorb the fluid therefrom.

8. A system according to claim 1, wherein the fluid comprises a gas selected from the group consisting of hydride gases, halide gases and gaseous organometallic Group V compounds.

9. A system according to claim 1, wherein the fluid comprises a gas selected from the group consisting of silane, diborane, germane, fluorine, ammonia, phosphine, arsine, stibine, hydrogen sulfide, hydrogen selenide, hydrogen telluride, boron trifluoride, boron trifluoride, tungsten hexafluoride, chlorine, hydrogen chloride, hydrogen bromide, hydrogen iodide, and hydrogen fluoride.

10. A system according to claim 1, wherein the physical sorbent comprises a sorbent material selected from the group consisting of carbon materials, crystalline aluminosilicate materials, silica, alumina, macroreticulate polymers and kieselguhr.

11. A system according to claim 1, wherein the physical sorbent comprises an activated carbon material.

12. A system according to claim 1, wherein the pump comprises a double-stage all-metal sealed diaphragm pump.

13. A system according to claim 1, further comprising a mass flow controller operatively arranged for controlling the flow of fluid discharged from the system.

14. A system according to claim 1, wherein said means comprise an absolute pressure regulator.

15. A system according to claim 1, wherein pressure is maintained in the retention structure in the range of from 50 to 700 Torr.

16. A system according to claim 1, further comprising a purifier to chemisorptively purify fluid discharged from the retention structure.

17. A system according to claim 1, wherein the storage and dispensing vessel is of elongate form and has an interior volume in the range of from 0.25 liter to about 40 liters.

18. A semiconductor manufacturing facility, comprising:

a system for supplying a fluid utilized in semiconductor manufacturing, such system including:

a storage and dispensing vessel, containing said physical sorbent;

a retention structure for holding fluid that is desorbed from the physical sorbent, for subsequent discharge of said fluid;

a pump arranged to transfer desorbed fluid from the storage and dispensing vessel to the retention structure for retention therein;

an actuating assembly for monitoring pressure of fluid held in the retention structure and responsively thereto adjusting the pumping action of the pump, to maintain a predetermined amount of fluid in the retention structure for subsequent discharge from the system; and a semiconductor manufacturing unit joined in fluid-receiving relationship to the retention structure for receiving fluid used in semiconductor manufacturing in said unit.

19. A manufacturing process wherein a process fluid is utilized to manufacture a product, said process comprising:

storing the fluid on a physical sorbent having sorptive affinity for the fluid, in a storage and dispensing vessel;

desorbing fluid from the sorbent;

flowing desorbed fluid from the storage and dispensing vessel to a retention structure;

maintaining the retention structure filled with a sufficient amount of the desorbed fluid for manufacturing the product;

discharging fluid from the retention structure; and utilizing the discharged fluid for manufacturing the product.

20. A manufacturing process according to claim 19, wherein the fluid comprises a gas selected from the group consisting of hydride gases, halide gases and gaseous organometallic Group V compounds.

21. A manufacturing process according to claim 19, wherein the fluid comprises a gas selected from the group consisting of silane, diborane, germane, fluorine, ammonia, phosphine, arsine, stibine, hydrogen sulfide, hydrogen selenide, hydrogen telluride, boron trifluoride, boron trifluoride, tungsten hexafluoride, chlorine, hydrogen chloride, hydrogen bromide, hydrogen iodide, and hydrogen fluoride.

22. A manufacturing process according to claim 19, wherein the physical sorbent comprises a sorbent material selected from the group consisting of carbon materials, crystalline aluminosilicate materials, silica, alumina, macroreticulate polymers and kieselguhr.

23. A manufacturing process according to claim 19, wherein the physical sorbent comprises an activated carbon material.

24. A manufacturing process according to claim 19, wherein the fluid in the retention structure is maintained at a pressure in the range of from 50 to 700 Torr.

25. A manufacturing process according to claim 19, wherein the fluid discharged from the surge tank is chemisorptively purified prior to being utilized for manufacturing the product.

26. A manufacturing process according to claim 19, which comprises a process step selected from the group consisting of ion implantation, water treatment and welding.

27. A manufacturing process according to claim 19, which comprises an ion implantation process step.

28. A manufacturing process according to claim 19, wherein the product is selected from the group consisting of semiconductors, flat panel displays, and emergency breathing equipment.

29. A manufacturing process according to claim 19, wherein the product comprises a semiconductor.

30. A manufacturing process according to claim 19, wherein the product comprises a flat panel display.

31. A manufacturing process according to claim 19, wherein said step of maintaining the retention structure filled with a sufficient amount of the desorbed fluid for manufacturing the product, comprises monitoring fluid pressure in the retention structure and responsively modulating the pumping of fluid to the retention structure, to maintain a predetermined fluid pressure and amount of fluid therein.

32. A manufacturing process according to claim 19, wherein the fluid is discharged at a predetermined flow rate from the retention structure for use in manufacturing the product.

33. A manufacturing process according to claim 32, wherein the predetermined flow rate is maintained by flowing the fluid through a mass flow controller and discharging the fluid from the mass flow controller at the predetermined rate, for use in manufacturing the product.

34. A manufacturing process according to claim 33, wherein:

said step of maintaining the retention structure filled with a sufficient amount of the desorbed fluid for manufacturing the product, comprises monitoring fluid pressure inside the retention structure and responsively pumping or terminating the pumping of fluid to the retention structure, to maintain a predetermined pressure and amount of fluid therein.

35. A manufacturing process wherein a process fluid is utilized to manufacture a product comprising a semiconductor, said process comprising:

storing the fluid on a physical sorbent having sorptive affinity for the fluid, in a storage and dispensing vessel;

desorbing fluid from the sorbent;

flowing desorbed fluid from the storage and dispensing vessel to a retention structure;

maintaining the retention structure filled with a sufficient amount of the desorbed fluid for manufacturing the product;

discharging fluid from the retention structure; and utilizing the discharged fluid for manufacturing the product comprising said semiconductor.

36. A system for storage and on-demand dispensing of a fluid that is sorbable on a physical sorbent material and subsequent to sorption is desorbable from the sorbent by pressure-mediated desorption and/or thermally-mediated desorption, said system comprising:

(i) a storage and dispensing vessel containing a physical sorbent having sorptive affinity for said fluid;

(ii) a desorbed gas retention structure for holding fluid that is desorbed from the physical sorbent, for subsequent discharge of fluid from the retention structure;

(iii) a pump arranged to transfer desorbed fluid from the storage and dispensing vessel to the retention structure; and (iv) means for sensing pressure of fluid in the surge tank and responsively modulating the flow of fluid from the storage and dispensing vessel to the retention structure by action of said pump.

37. A system according to claim 36, wherein said means (iv) comprise a pressure monitor operatively coupled with the retention structure to monitor fluid pressure therein and to responsively actuate or deactuate the pump to maintain a selected fluid pressure in the retention structure for subsequent dispensing of fluid therefrom.

38. A system according to claim 36, wherein said means (iv) comprise a valve controlling fluid flow to the pump, and a pressure monitor constructed and arranged to monitor pressure of fluid in said retention structure and to responsively modulate the valve to control flow of fluid from the storage and dispensing vessel to the pump, to maintain at least a selected amount of desorbed fluid in the retention structure for subsequent dispensing thereof.

39. A system according to claim 36, wherein said means (iv) comprise a back pressure regulator coupled in pressure-responsive relationship with the retention structure and operative to impose a back pressure on fluid flowed to the pump from the storage and dispensing vessel, of sufficient magnitude to maintain a selected inventory of fluid in the retention structure for subsequent dispensing thereof.

* * * * *

UNITED STATES PATENT AND TRADEMARK OFFICE
CERTIFICATE OF CORRECTION

PATENT NO : 5,916,245

DATED : June 29, 1999

INVENTOR(S) : Glenn M. Tom

It is certified that error appears in the above-identified patent and that said Letters Patent are hereby corrected as shown below:

Column 2, line 13: change "adsorptiondesorption" to --adsorption-desorption--.
Column 2, line 61: change "des-" to --de- --.
Column 5, line 10: after "carbon" delete "1".
Column 6, line 47: change "fourway" to --four-way--.
Column 6, line 49: change "fourway" to --four-way--.
Column 7, line 11: change "holdup" to --hold-up--.
Column 10, line 32: change "orga-" to --organ- --.

Signed and Sealed this

Tenth Day of April, 2001

Attest:

Nicholas P. Godici

NICHOLAS P. GODICI

*Attesting Officer* *Acting Director of the United States Patent and Trademark Office*